US006122100A

United States Patent [19]
Miller

[11] Patent Number: 6,122,100
[45] Date of Patent: Sep. 19, 2000

[54] HEADGEAR APPARATUS FOR VIEWING IN A PERISCOPIC DIRECTION AND A FORWARD DIRECTION SIMULTANEOUSLY

[76] Inventor: Robert D. Miller, 871 Magnolia Dr., Larkspur, Calif. 94939

[21] Appl. No.: 09/196,936

[22] Filed: Nov. 20, 1998

[51] Int. Cl.[7] .................................................. G02B 23/08
[52] U.S. Cl. .......................... 359/402; 359/403; 359/404; 359/405; 359/406
[58] Field of Search ........................... 359/402, 403, 359/404, 405, 406, 407, 399, 408

[56] References Cited

U.S. PATENT DOCUMENTS

| | | | |
|---|---|---|---|
| 3,084,687 | 4/1963 | Kallmeyer | 359/407 |
| 3,596,082 | 7/1971 | Doret et al. | 240/26 |
| 4,434,702 | 3/1984 | Rozner et al. | 350/544 |
| 4,704,014 | 11/1987 | Carner, Jr. | 351/43 |
| 4,859,045 | 8/1989 | Dagan et al. | 350/623 |
| 4,887,893 | 12/1989 | Dahlgren | 350/618 |
| 4,932,765 | 6/1990 | Carner, Jr. | 350/575 |
| 4,934,246 | 6/1990 | Benson et al. | 89/36.14 |
| 4,964,712 | 10/1990 | Anderson | 350/618 |
| 4,981,346 | 1/1991 | Marschner | 350/540 |
| 5,170,190 | 12/1992 | Berke | 351/43 |
| 5,526,177 | 6/1996 | Fantone | 359/402 |
| 5,526,178 | 6/1996 | Goldstein et al. | 359/407 |
| 5,581,822 | 12/1996 | Tagyo | 2/428 |
| 5,875,488 | 3/1999 | Milani | 2/12 |
| 5,886,839 | 3/1999 | Arone et al. | 359/857 |
| 5,906,199 | 5/1999 | Budzinski | 128/201.11 |

*Primary Examiner*—Georgia Epps
*Assistant Examiner*—Tim Thompson
*Attorney, Agent, or Firm*—Lumen Intellectual Property Services

[57] ABSTRACT

Headgear apparatus allows a viewer to see objects in a periscopic direction and a normal direction simultaneously. A periscope is mounted to a headpiece that is easily supported by the viewers head. The periscope has movable mirrors and an extending periscope section to allow the viewer to change the angle of the periscopic view relative to a plane containing a normal line of sight and the peripheral distance of the periscopic view, respectively. The apparatus further has a sectional periscope, whereby sections containing the reflective elements of the periscope can be rotated relative to each other and change the periscopic view in the plane of the forward line of sight. The head gear apparatus is adapted to a mask or an underwater mask that allows a viewer to see objects in a periscopic direction and a forward direction in diverse environments such as under water.

27 Claims, 6 Drawing Sheets

HEADGEAR APPARATUS FOR VIEWING IN A PERISCOPIC DIRECTION AND A FORWARD DIRECTION SIMULTANEOUSLY

FIELD OF THE INVENTION

This invention relates generally to enhancing a viewer's field of view. More particularly, it relates to an apparatus for allowing a viewer to see objects in a periscopic direction and objects in a forward direction simultaneously.

BACKGROUND

A periscopic view here is meant to describe a view that is spatially displaced in a peripheral direction from a viewer's normal forward line of sight. Alternatively, a periscopic direction is a line of sight that is parallel to a viewer's normal line of sight but that is displaced above, below, to the right or to the left of a viewer's line of sight by a given distance. The forward line of sight is defined by an imaginary line that that extends forward from the center of a person's field of view while the person is looking forward. Herein, the plane of the normal line of sight is meant to be a plane that contains the forward line of sight.

Periscopes have long been used as viewing devices in submarines. The periscope allows a viewer inside a submersed submarine to view a circumference of area above the surface of the water. Periscopes are also used as toys or spying devices to view around corners without a viewer's normal line of sight being around the corner. Several new uses and improvements for periscopes have been reported.

U.S. Pat. No. 4,934,246 to Benson et al. describes a wide angle trapezoidal periscope useful for wide angle viewing in vehicles such as tanks. The periscope allows the driver to view a field of view above the cockpit of the tank while the driver remains low and inside the tank, thereby keeping the driver out of harms way during a military operation. U.S. Pat. No. 3,596,082 to Doret et al. describes a periscope device used to view objects under water from a buoyant vessel such as a boat. Marschner in U.S. Pat. No. 4,981,346 describes a completely collapsible periscope that can be folded into a single flat piece. A toy periscope is described by Dahlgren in U.S. Pat. No. 4,887,893 whereby the periscope housing is made of a single blown molded piece. In U.S. Pat. No. 5,526,177 Fantone describes a hand held periscope for viewing underwater while the viewer is above the water. Periscopes described in prior art can not be conveniently be used by an underwater viewer such as a diver or by a viewer in an environment where the viewer's hand must be available for other activities. Additionally, periscopes described in prior art are not designed for a viewer to see objects in both a periscopic direction and a normal forward direction simultaneously.

Berke in U.S. Pat. No. 5,170,190 describes using a prism device in combination with an underwater mask to increase the upward and downward peripheral view of an underwater swimmer. U.S. Pat. No. 4,704,014 to Carner, Jr. describes an underwater mask with several optical configurations to enhance the peripheral view of a diver underwater and U.S. Pat. No. 4,932,765 further elaborates on optical configurations to enhance a viewer's peripheral vision using a headgear apparatus. This prior art also fails to describe an apparatus for allowing a viewer to see objects in a periscopic direction underwater or for allowing a viewer to see objects in a periscopic a normal forward direction simultaneously.

There is a need for an apparatus that allows a viewer to see objects in a periscopic direction and in a normal forward direction simultaneously. The apparatus needs to be supported by the viewer's head so that the viewer's hands are free for other activities. There is a further need for an apparatus that allows a viewer to see objects in a periscopic direction and a normal forward direction when the viewer is underwater or in other environments where the eyes and face require protection.

OBJECTS AND ADVANTAGES

Accordingly, it is a primary object of the present invention to provide a headgear apparatus that is supported by a viewers head allowing the viewer to see objects in a periscopic direction and objects in a normal forward direction simultaneously. The apparatus has the advantages of allowing the viewer to see objects above, around or under other objects without placing the viewers head directly in a line of sight with objects to be viewed. The apparatus has the further advantage of allowing the viewers hands to be free to perform other tasks while viewing objects in a periscopic direction and objects in a normal forward direction. Such a device is useful for a mechanic that is working on a device that effects the operation of another device that is in periscopic direction and can not be viewed from the mechanics in the forward line of sight. The headgear apparatus is capable of being shortened or lengthened to allow the viewer to see a range of periscopic directions.

A further object of this invention is to provide an apparatus that has a mask and a periscope. A viewing portion of the periscope is in the field of view of a viewer wearing the apparatus. The mask and periscope are designed to provide an essentially airtight or watertight seal between a region of the viewer's face that includes the viewers eyes. The mask protects this region of the viewer's face from an external environment while allowing the viewer to see objects in a periscopic direction and objects in a normal forward direction. The apparatus provides all the advantages of the headgear apparatus described above, but also allows the viewer to see objects in a periscopic direction and normal forward direction underwater and in other environments where the eyes and face require protection. The apparatus also has a strap attached the mask for supporting a snorkel or a snorkel device to provide the viewer with an oxygen source while underwater or in harsh breathing environments.

A further object of this invention is to provide an apparatus that has a mask and a periscope whereby the viewer can later the direction of the periscopic view either parallel to the normal line of sight or out of the plane of the normal line of sight.

SUMMARY

These objects and advantages are attained by a headgear apparatus with a forehead support frame and a periscope connected to the forehead support frame. The periscope is preferably connected to the forehead support frame to provide a viewer wearing the headgear a periscopic view that is above the viewer's forward line of sight. The periscope is positioned with the periscopic viewing portion in the field of view of the viewer wearing the headgear apparatus so that the viewer can see objects in both a normal forward direction and objects in a periscopic direction simultaneously. The forehead support frame is curved to fit the contour of a viewer's head and provides a separation between the viewer's head and the periscope. The entire headgear is supported by and secured to the viewer's head. Preferably, an elastic strap is connected to the forehead support device to secured to headgear apparatus to the viewers head.

The periscope that is connected to the forehead mounting device is comprised of a periscope duct with an inlet, wherein images in a periscopic direction are received. A flat reflective surface is positioned in the inlet and positioned at an angle to reflect the images through the duct. The flat reflective surface is adjustable to allow the viewer to change the angle of the pericaopic view with respect to the normal line of sight. A second flat reflective surface is positioned at a viewing section of the periscope and at an angle to reflect images that are reflected through the periscope duct through the viewing section of the periscope and thus allowing a viewer wearing the headgear apparatus to see in a periscopic direction and in a normal forward direction. The first reflective and second reflective surface are preferably mirrors. The periscope duct is capable of extending and contracting. A particular embodiment of the invention relates to a modified periscope duct, whereby the duct is made of a flexible material having accordion pleats thus allowing the periscope length to be increase or decreased. Alternatively, a periscope duct is made of two or more duct sections of slightly different size such that a duct section can fit inside a next bigger duct section. This allows the periscope duct to expand and contract in a telescoping manner. A further embodiment of the invention has a duct comprised of sections that can be rotated and allow the viewer to change the direction of the periscopic view within the plane of the normal line of sight. The periscope duct is round, square, rectangular, oval, or oblong and is preferably 6 to 24 inches in length when fully extended.

An alternative embodiment of this invention is an apparatus for viewing simultaneously a normal forward direction and a periscopic direction isolating a viewers eyes and a region of the viewers face form an external environment while the viewer is wearing the apparatus. The apparatus is completely supported by the viewer's head and is preferably secured to the viewers head by an elastic strap. The apparatus comprises a mask with a transparent mask lens. The mask is capable of providing a substantially air and watertight seal between the region of said viewer's face, wherein the mask and the transparent mask lens define the viewer's field of view. An essentially air and watertight periscope is connected to the mask with the periscope viewing section positioned in the field of view.

The periscope portion of the apparatus has a straight periscope duct with an inlet. The duct is mounted to the to of the mask and the inlet facing forward and is parallel to the forward viewing direction of the mask. The duct is rigid or capable of extending and contracting in either in a accordion or telescoping fashion described above. A transparent inlet lens covers the inlet and prevents air or water from entering duct but allows light images of objects in a periscopic direction to pass through the inlet lens. A first flat reflective surface is positioned in the inlet and at an angle to reflect images through the duct to a second flat reflective surface. The angle of the first flat reflective surface is adjustable to change the angle of the periscopic view relative to the viewers normal line of sight. The second reflective surface is positioned at the viewing section of the periscope such that images reflected through the periscope duct are reflected by the second reflective surface through the viewing section of the periscope and into the field of view of a viewer wherein the apparatus. The first reflective surface and second reflective surface are preferably mirrors and the periscopic direction is preferably a forward periscopic direction.

The preferred embodiment of the invention is an apparatus for viewing objects in a forward periscopic direction and a normal forward direction simultaneously underwater. The apparatus has a mask that protects the eyes and a region of the viewers face while the viewer is wearing the apparatus and is submersed underwater. The mask has a transparent mask lens and provides an essentially watertight seal between the region of the viewer's face and the mask. An essentially watertight periscope is connected to the top of the mask with the viewing section of the periscope being position in the field of view defined by the mask.

The periscope that is connected to the mask has a rigid oblong tubular housing. The oblong tubular housing is connected to the top of the mask with the elongated radius of the oblong tubular housing essentially parallel to the a plane defined by the transparent mask lens. The oblong tubular housing has an oblong inlet that is at essentially a 90° angle to the oblong tubular housing. The inlet is covered by an transparent inlet lens the is essentially parallel to the transparent mask lens. The transparent inlet lens covers the oblong inlet and prevents water from entering the oblong tubular housing and allows light images from a periscopic view to enter. A flat rectangular mirror is placed essentially at a 45° angle at the back of the oblong inlet so the light images from the objects are reflected through the oblong tubular housing. A lens that magnifies the light images of the objects is supported in the oblong tubular housing by groves close to the viewing portion of the periscope. A second rectangular mirror is placed a essentially at a 45° in a viewing portion of the periscope. The reflective surface of the second rectangular mirror reflects images from the oblong tubular housing through the viewing section of the periscope that faces the inside of the mask. The viewing portion of the periscope is preferably visible in top portion of the inside of the mask thus allowing the viewer wearing the apparatus to see in the normal forward direction and in a forward periscopic direction. The apparatus is supported by the viewers head and is secured to the viewers head preferably by an elastic strap.

Alternatively, the periscope described above has a tubular housing that is sectional, whereby the upper portion of the duct can be rotated to change the viewers periscopic direction within the plane of the normal line of sight. The mask also has a strap to hold a snorkel or the mask is modified to have a snorkel permanently attached to the mask. A light source is built in the periscope to assist a diver ability to view a periscopic direction in dark water. The light source can be permanently attached to the apparatus or can be a removable light source.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1A:
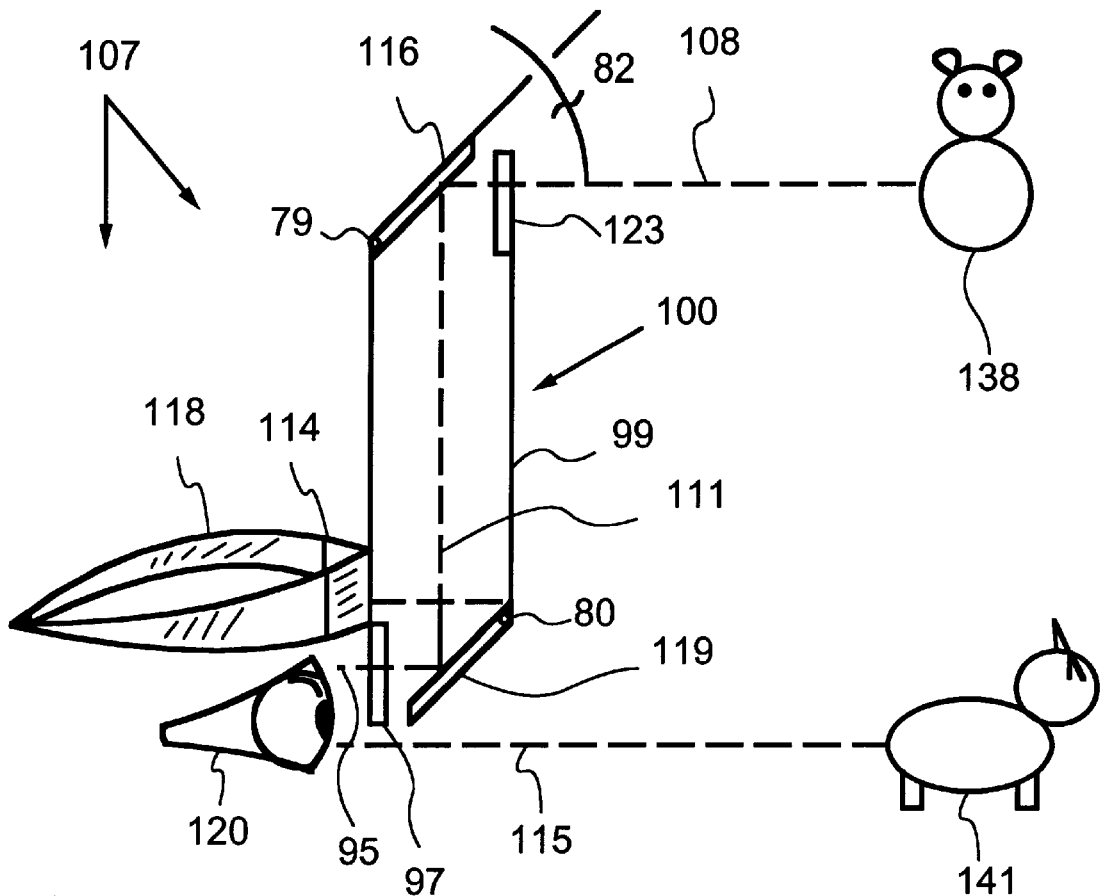
FIG. 1A is a headgear apparatus of this invention for viewing in a periscopic direction and a normal forward direction simultaneously.

Referring to FIG. 1A, headgear apparatus 107 of the invention is illustrated. A periscope 100 connected to a forehead support frame 114 so that a viewer 120 wearing the headgear 107 will view an image 138 in a periscopic direction 108 in the top portion of the viewers field of view 108. Further the periscope 100 is position so that the viewer 120 can simultaneously view a normal forward direction 115 and a periscopic direction 108. The forehead support 114 frame and is curved to fit the contour of a viewer's head and provides a separation between the viewer's head and the periscope 100. The entire headgear 107 is capable of being supported by and secured to the viewer's head. Preferably, an elastic strap 118 is connected to the forehead support device to secured to headgear apparatus to the viewers head.

Again referring to FIG. 1A, The periscope 100 comprises a periscope duct 99 with an inlet 123 wherein images of an object 138 in a periscopic direction 108 are received. A first flat reflective surface 116 is position in the inlet and positioned at an angle to reflect the image through 111 the periscope duct 99. A second flat reflective surface 119 is positioned at the viewing section 95 of the periscope allowing the viewer 120 to see a object 138 in the periscopic direction 108 and a object 141 in a normal forward direction 115 simultaneously. The first reflective surface 116 and the second reflective surface 119 are preferably mirrors. The first reflective surface 116 and the second reflective surface 119 are preferably connected to a hinges 79 and 80, respectively. The hinge 79 allow the viewer 120 to change the angle 82 of the periscopic direction 108 relative to the plane of the forward line of sight 115. The hinge 80 allows the viewer 120 to remove the second reflective surface 119 form the viewers field of view without removing the head gear apparatus.

Figure 1B:
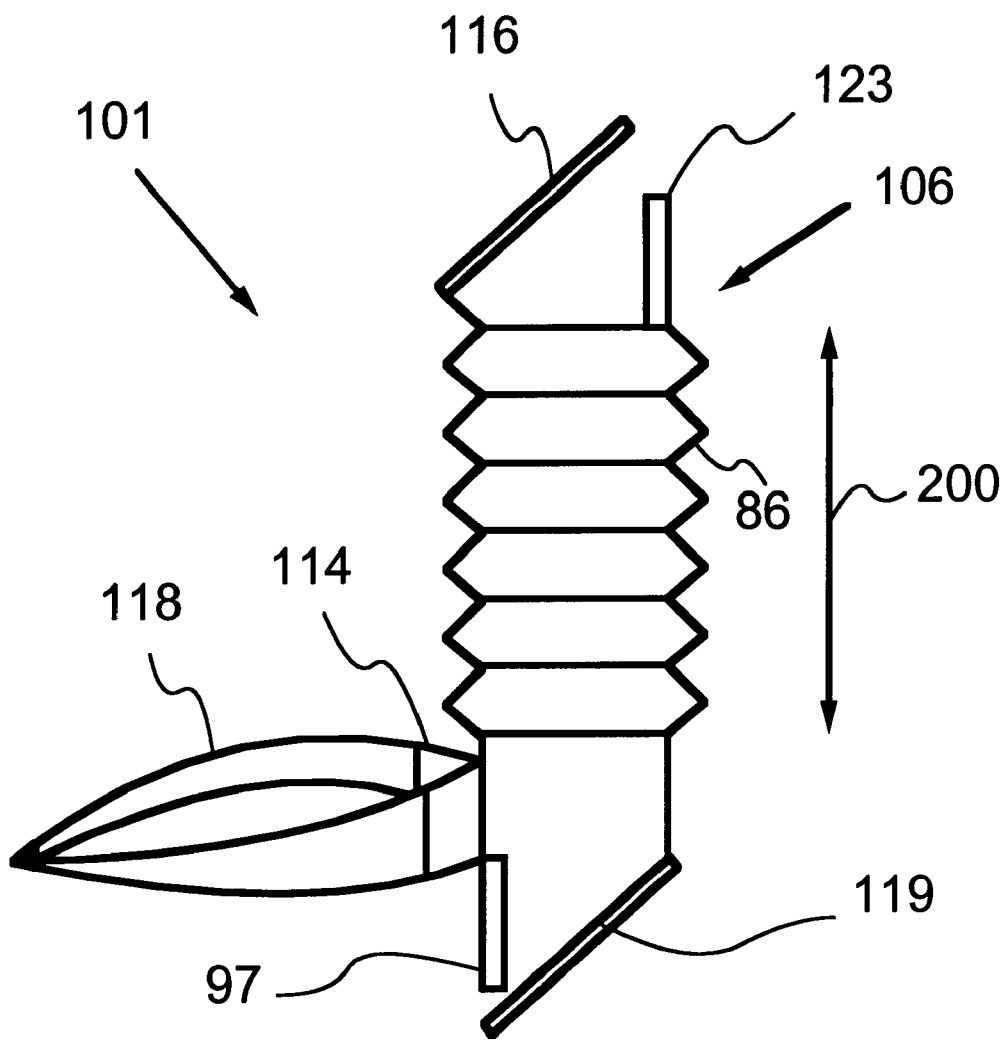
FIG. 1B is a headgear apparatus of this invention with an accordion periscope duct for adjusting a periscopic direction while viewing in the periscopic direction and a normal forward direction simultaneously.
Figure 1C:
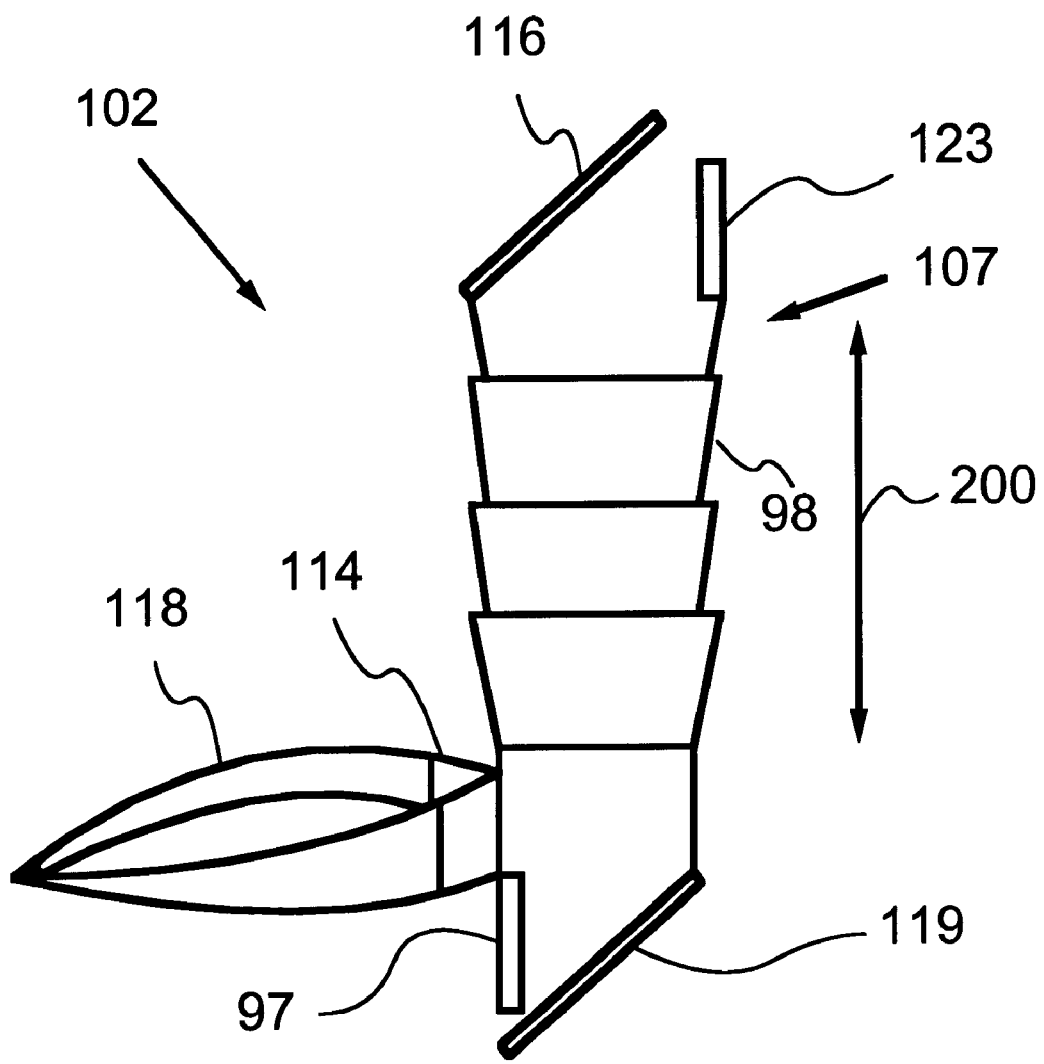
FIG. 1C is a headgear apparatus of this invention with a telescoping periscope duct for adjusting a periscopic direction while viewing in the periscopic direction and a normal forward direction simultaneously.

Referring to FIG. 1B, the periscope 101 comprises a periscope duct 106 with accordion pleats 86 that allow the periscope duct length 200 to contract or expand and thereby changing the peripheral displacement of the periscopic direction viewed through the headgear apparatus. Alternatively, referring to FIG. 1C a periscope duct 107 is made of two or more duct sections of slightly different size or that are tapered 98 such that one duct section can fit inside the next bigger duct section. This allows the duct length 201 to expand and contract in a telescoping manner. The periscope ducts 99 (FIG. 1A), 106 (FIG. 1B) and 107 (FIG. 1C) are round, square, rectangular, oval, or oblong and preferably 6 to 24 inches in length when fully extended. Further, a periscope duct that is sectional and is capable of rotating the first reflective surface 116 relative to the second reflective surface 119 and thus changing the viewer's periscopic viewing direction relative to the plane of the normal line of sight.

Figure 2A:
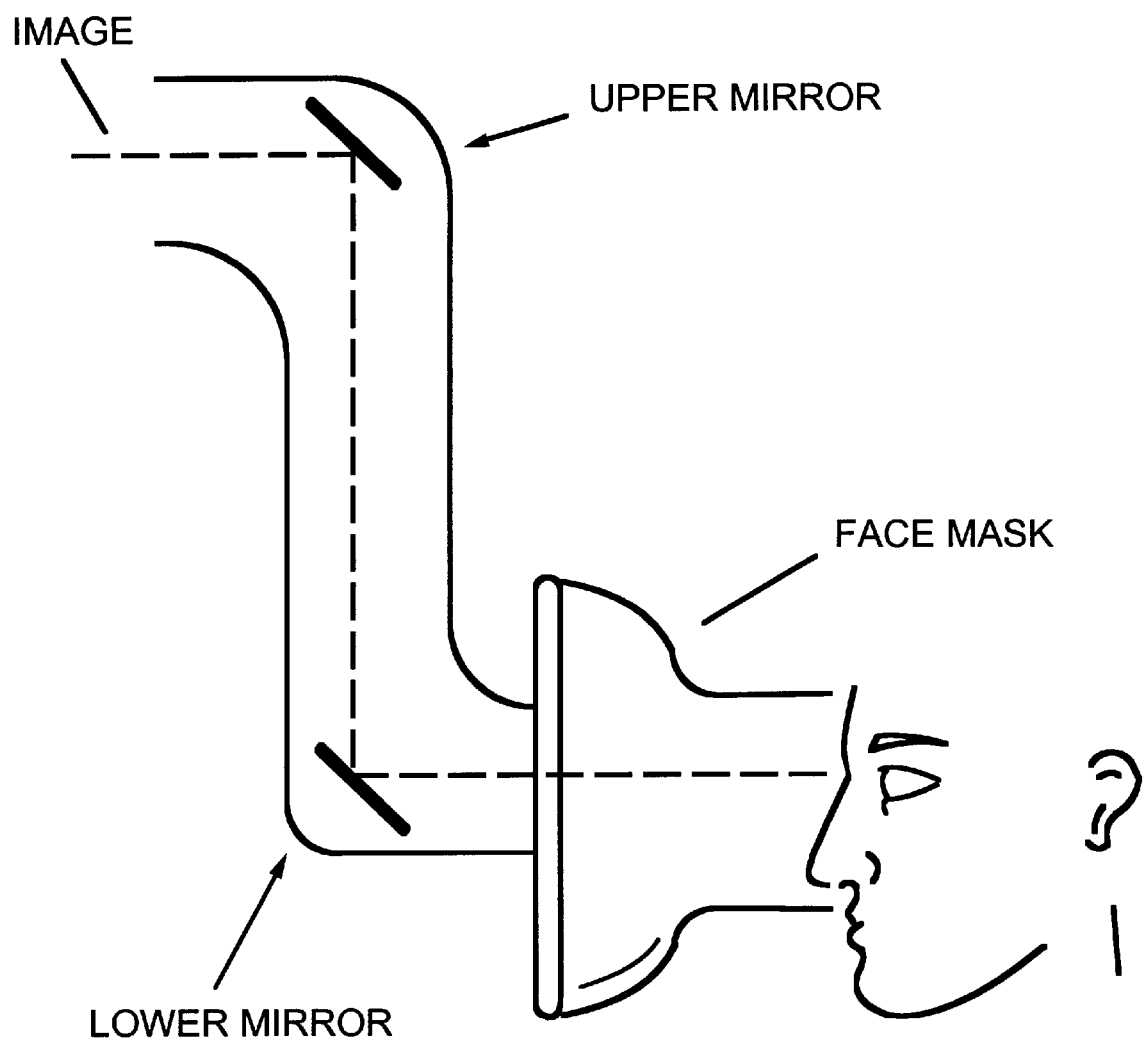
FIG. 2A is a view of a swimmer wearing an apparatus for viewing in a periscopic direction and a normal forward direction simultaneously while the swimmer is underwater.
Figure 2B:
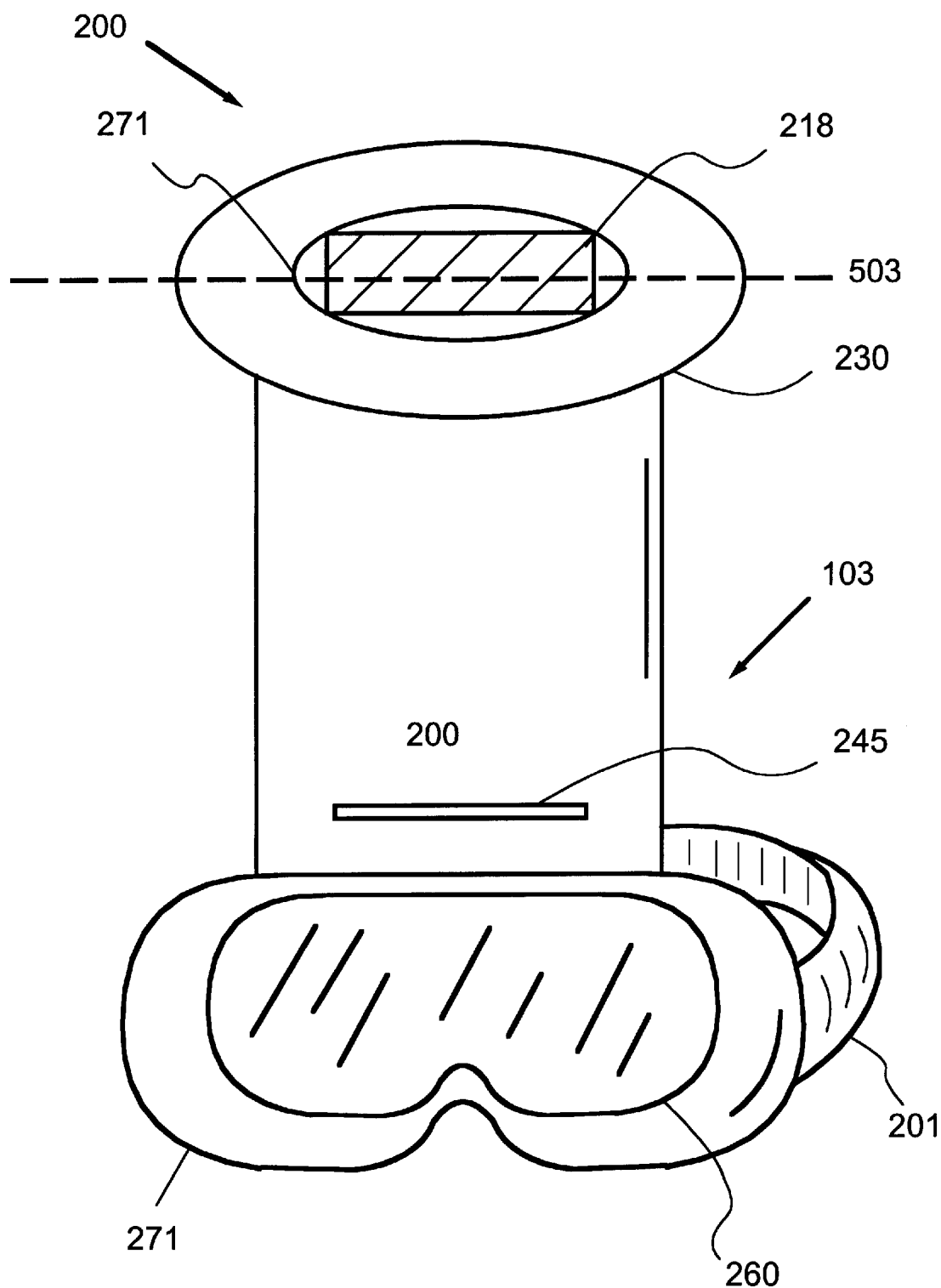
FIG. 2B is a front view of an apparatus for viewing in a periscopic direction and a normal forward direction simultaneously while the swimmer is underwater.

FIG. 2A illustrates the preferred embodiment of this invention. An apparatus 200 for viewing objects in a normal forward direction and a forward periscopic direction simultaneously under while a viewer 203 is underwater. Referring to FIG. 2B, the apparatus is comprised of a mask 271 that protects the eyes and a region of the viewers face while the viewer is wearing the apparatus and is submersed underwater. The mask 271 has a transparent mask lens 260 and a strap 201. The mask 271 is essentially watertight and has a periscope 101 connected to the top of the mask 278 with the viewing section of the periscope being position in the field of view defined by the inside of the mask.

Figure 2C:
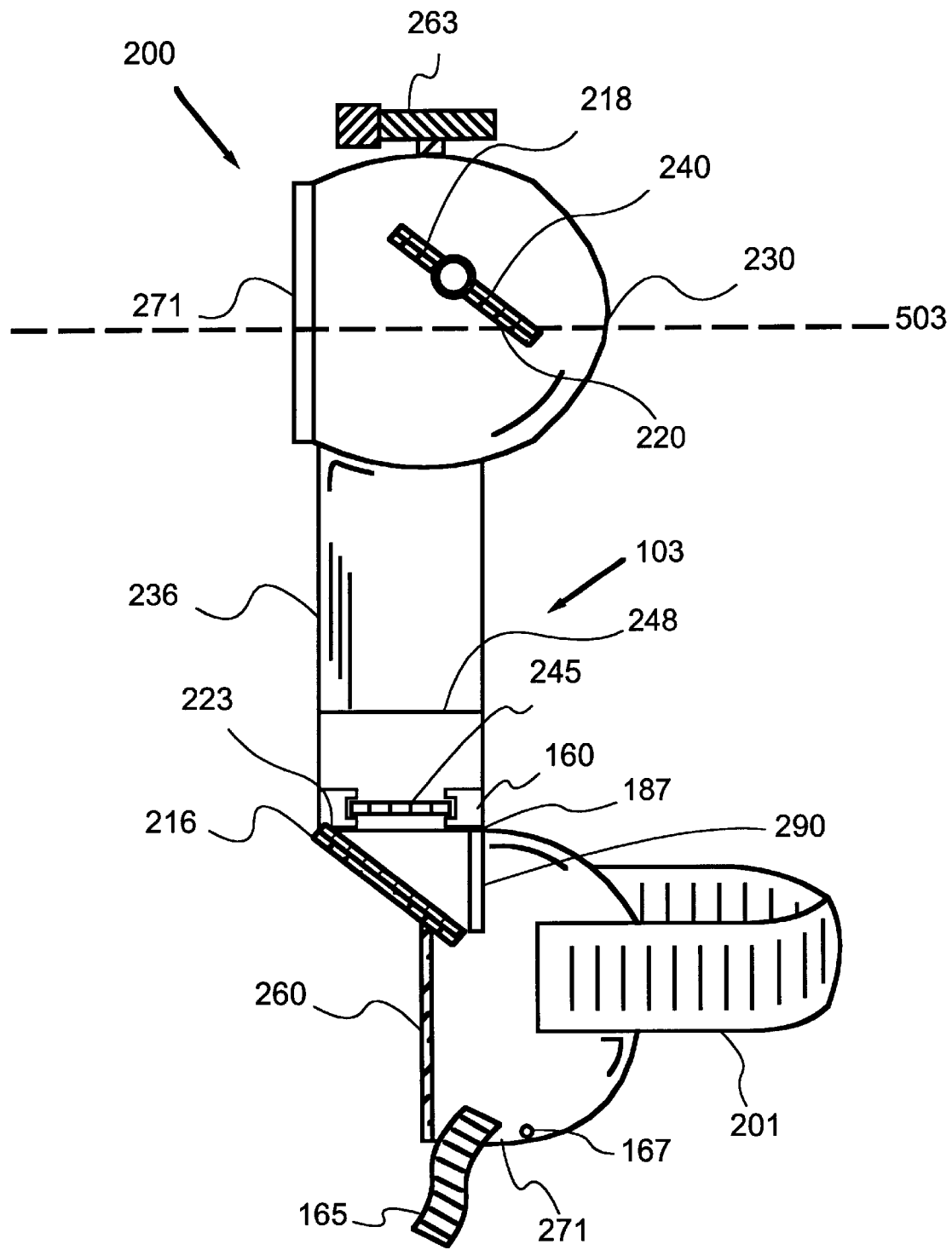
FIG. 2C is a cross section of an apparatus for viewing in a periscopic direction and a normal forward direction simultaneously while the swimmer is underwater.

Referring to FIG. 2C, the periscope 103 that is connected to the mask 271 and has a rigid oblong tubular housing 236. The oblong tubular housing is connected to the top of the mask 187 with the elongated radius of the oblong housing essentially parallel to the a plane defined by the transparent mask lens 260. The oblong tubular housing 236 has an oblong inlet 230 that is at essentially a 90° angle to the oblong tubular housing 236. The inlet is covered by an transparent inlet lens 271 that is essentially parallel to the transparent mask lens 260. The transparent inlet lens 271 covers the oblong inlet 230, prevents water from entering the oblong tubular housing 236 and allows images in a periscopic view to enter. A flat rectangular mirror 218 is placed at the back of the oblong inlet 230 with the reflective surface 220 at essentially a 45° angle relative to a plane perpendicular to a plane defined by the transparent inlet lens 503 whereby images in the periscopic direction are reflected through the oblong tubular housing 236. A lens 245 that magnifies the images reflected through the oblong tubular housing 236 is held within the cavity of the oblong tubular housing 236 by groves 160 close to the viewing portion of the periscope. A second rectangular mirror 216 is placed in the viewing section 290 of the periscope 103 with the reflective surface 223 at essentially a 135° relative to a plane perpendicular to a plane defined by the transparent inlet lens 503 so that images that are reflected by the mirror 218 and magnified by the lens 245 are reflected through the viewing section 290 of the periscope that faces the inside of the mask. The viewing section of the periscope 290 is visible in top portion of the field of view thus allowing the viewer wearing the apparatus to see in the normal forward direction and in a forward periscopic direction while submersed underwater.

The apparatus 200 further has a means for tilting and rotating the first reflective surface, whereby the viewer can change the periscopic view relative to the plane of the normal forward direction. The mask is equipped with a strap 165 and a fastening means 167 to secure a snorkel (not shown) in order to provide the view with a source of oxygen when the viewer is in harsh breathing conditions such as under water or alternative, a snorkel can be permanently attached to the mask. The duct 103 is also made sectional by a dividing means 248 that allows the top portion of the duct to be rotated relative to the lower potion of the duct and change the viewer periscopic view relative to the plane of the normal forward view. In a further embodiment a light source 263 is attached to the apparatus to improve a viewer's vision in dark condition. The light source 263 can be permanently attached to the apparatus or can be detachable.

It will be clear to one skilled in the art that the above embodiment may be altered in many ways without departing from the scope of the invention. For example, the apparatus can be modified to a mask that supplies a source of oxygen for extended use under water or other environments that do not supply suitable breathing conditions. Accordingly, the scope of the invention should be determined by the following claims and their legal equivalents.

What is claimed is:

1. A headgear apparatus for viewing simultaneously a forward direction and a periscopic direction in a viewer's field of view wherein said apparatus is capable of being supported by a viewer's head said apparatus comprising:

a) a forehead support frame;

b) a means to secure said forehead support frame to a said viewers head;

c) a periscope connected to said forehead support, said periscope being capable of projecting images from said periscopic direction to a top portion of said viewer's field of view, said periscope comprising;

i) a periscope duct with an inlet wherein light images from said objects in said periscopic direction are received and a viewing section for viewing said light images from said objects in said periscopic direction;

ii) a first reflective surface position near said inlet and positioned at an angle to reflect said light images through said periscope duct;

iii) a second reflective surface positioned near said viewing section, whereby said light images that are reflected through said tubular housing are viewable from said second reflective surface, said second reflective surface being hinged such that said second reflective surface is capable of being moved in and out of said viewer's field of view.

2. The headgear apparatus of claim 1 wherein said forehead support frame is curved to fit the contour of said viewer's head and provides a separation between said viewer's head and said periscope while said viewer is wearing said headgear apparatus.

3. The headgear apparatus of claim 1 wherein said means to secure said forehead support frame to said viewers head is a strap connected to said forehead support and wherein said strap is made from an elastic material selected from the group consisting of rubber, plastic and cloth.

4. The apparatus of claim 1 wherein said periscope duct is comprised of sections whereby each section fits inside a larger adjacent section and said periscope duct is capable of extending and contracting in a telescoping manner.

5. The apparatus of claim 1 wherein said periscope duct has accordion pleats that allow said periscope duct to extend and contract in an accordion fashion.

6. The apparatus of claim 1 wherein said periscope duct has a cross sectional shape selected from the group consisting of round, square, rectangular, oval and oblong.

7. The apparatus of claim 1 wherein said first reflective surface and said second reflective surface are mirrors.

8. The apparatus of claim 1 wherein said first reflective surface is hinged whereby changing the position of said first reflective surface changes said periscopic direction.

9. The apparatus of claim 1 wherein said periscope duct comprises at least two sections, whereby a top section comprises said first reflective surface and a bottom section comprises said second reflective surface, said top section and bottom section being capable of rotating relative to each other thereby changing said periscopic direction within a plane of a forward line of sight.

10. An apparatus for allowing a viewer with at least one eye and a face to view a forward direction and a periscopic direction simultaneously in a field of view while said a viewer is wearing said apparatus, wherein said apparatus isolates said at least one eye and a region of said face form an external environment said apparatus comprising:

a) a mask with a transparent lens, said mask for providing a substantially air tight seal between said region of said face and said mask, whereby said mask and said transparent lens define said field of view;

b) a means for holding said mask firmly against said face of said viewer to maintain an essentially air tight seal;

c) an essentially airtight periscope connected to said mask and extending upward from said mask, said periscope for projecting said images from said periscopic direction into a viewing section positionable in a top portion of said field of view, said periscope comprising;

i) a periscope duct with an inlet wherein light images from objects in said periscopic direction are received;

ii) a first reflective surface position near said inlet and positioned at an angle to reflect said light images through said periscope duct;

iii) a second reflective surface positioned near said viewing section, whereby said light images are capable of being reflected through said viewing section and wherein said second reflective surface is hinged and capable of being moved in and out of said viewer's field of view.

11. The apparatus of claim 10 wherein said a means for holding said mask firmly against said face of said view is a strap connected to said mask, said strap is made of an elastic material selected from the group consisting of rubber, plastic and cloth.

12. The apparatus of claim 10 wherein said periscope duct is comprised of sections whereby each section fits inside a larger adjacent section and is capable of extending and contracting in a telescoping manner.

13. The apparatus of claim 10 wherein said periscope duct has accordion pleats that allow said periscope duct to extend and contract in an accordion fashion.

14. The apparatus of claim 10 wherein said periscope duct has a cross sectional shape selected from the group consisting of round, square, rectangular, oval and oblong.

15. The apparatus of claim 10 wherein said first and said second reflective surfaces are mirrors.

16. The apparatus of claim 10 wherein a wide angle lens is positioned in oblong periscope duct between said first reflective surface and said second reflective surface to allow said viewer see a wide angle view in said periscopic direction.

17. The apparatus of claim 10 wherein said first reflective surface is hinged and whereby changing position of said first reflective surface mirror changes said periscopic view.

18. An apparatus for allowing a viewer with at least one eye and a face to view a forward direction and a periscopic direction in a single field of view said apparatus being capable of isolating said at least one eye and a region of said face, said apparatus comprising:

a) a mask with a transparent lens for providing an essentially water tight seal between said region of said face and said mask, whereby said mask and said transparent lens define said field of view;

b) a means for holding said mask firmly against said face to maintain said essentially water tight seal;

c) an periscope connected to said mask for projecting images from said periscopic direction into a portion of said field of view, said periscope being essentially watertight and extending upward from said mask, said periscope comprising:

i) tubular housing with an inlet covered by a transparent lens through which images from said periscopic direction are received;

ii) a first reflective surface position in said tubular housing to reflect images from said periscopic direction through said tubular housing;

iii) a second reflective surface positioned in a viewing section of said periscope for receiving images from said first reflective surface;

iv) a magnification lens is positioned in said tubular housing between said first reflective surface and said second reflective surface to allow said viewer see a magnified view in said periscopic direction.

19. The apparatus of claim 18 wherein said means for holding said mask firmly against said face is a elastic strap connected to said mask, said strap being made of an elastic material selected from the group consisting of rubber, elastic, plastic and cloth.

20. The apparatus of claim 18 wherein said tubular housing is 6 to 24 inches long.

21. The apparatus of claim 18 wherein said first and said second reflective surfaces are mirrors.

22. The apparatus of claim 18 wherein said periscope comprises at least two sections, wherein a top section comprises said first reflective surface and a bottom section comprises said second reflective surface, said top section and bottom section being capable of rotating relative to each other thereby changing said periscopic view.

23. The apparatus of claim 18 further comprising a snorkel permanently attached to said mask.

24. The apparatus of claim 18 further comprising a means for attaching a snorkel to said mask.

25. The apparatus of claim 18 wherein said second reflective surface is a hinged and is capable of being moved in and out of a viewer's line of sight.

26. The apparatus of claim 18 wherein said first reflective surface is hinged such that changing position of said first reflective surface changes said periscopic view.

27. A headgear apparatus for viewing simultaneously a forward direction and a periscopic direction in a viewer's field of view wherein said apparatus is capable of being supported by a viewer's head said apparatus comprising:

a) a forehead support frame;

b) a means to secure said forehead support frame to a said viewers head;

c) a periscope connected to said forehead support, said periscope being capable of projecting images from said periscopic direction to a top portion of said viewer's field of view, said periscope comprising;

i) a periscope duct with an inlet wherein light images from said objects in said periscopic direction are received and a viewing section for viewing said light images from said objects in said periscopic direction;

ii) a first reflective surface position near said inlet and positioned at an angle to reflect said light images through said periscope duct;

iii) a second reflective surface positioned near said viewing section, whereby said light images that are reflected through said tubular housing are viewable from said second reflective surface; and iv) a magnification lens is positioned in said periscope duct between said first reflective surface and said second reflective surface to allow said viewer see a magnified view in said periscopic direction.

* * * * *